United States Patent [19]

Long

[11] Patent Number: 4,592,149
[45] Date of Patent: Jun. 3, 1986

[54] APPARATUS FOR VERIFYING THE ACCEPTABILITY OF THE CURVATURE OF A CURVED OBJECT

[75] Inventor: Gerald R. Long, Lititz, Pa.
[73] Assignee: RCA Corporation, Princeton, N.J.
[21] Appl. No.: 724,630
[22] Filed: Apr. 18, 1985
[51] Int. Cl.[4] .............................................. G01B 7/28
[52] U.S. Cl. ....................................... 33/550; 33/552; 33/557
[58] Field of Search ................. 33/546, 549, 550, 551, 33/552, 557, 560, 175

[56] References Cited

U.S. PATENT DOCUMENTS

| | | | |
|---|---|---|---|
| 3,110,112 | 11/1963 | Dalgleish | 33/552 |
| 3,309,493 | 3/1967 | Vitale | 219/79 |
| 3,537,159 | 11/1970 | Gartner et al. | 29/25.2 |
| 3,537,161 | 11/1970 | Kautz | 29/25.15 |
| 3,895,446 | 7/1975 | Orlon et al. | 33/560 |
| 4,221,053 | 9/1980 | Bobel et al. | 33/552 |
| 4,400,884 | 8/1983 | Baresh et al. | 33/552 |

Primary Examiner—Willis Little
Attorney, Agent, or Firm—E. M. Whitacre; D. H. Irlbeck; L. L. Hallacher

[57] ABSTRACT

An apparatus for verifying the acceptability of the curvature of kinescope shadow mask after such masks are welded to the support frame includes a fixed member having a surface curved to conform to the curvature of the shadow mask. Sensors are embedded in the curved surface and engage a shadow mask placed on the fixed member. A movable support frame includes support members which support the shadow mask frame above the fixed member while the mask is welded to the shadow mask frame. The sensors also are movable along with the movable support frame. After the welding is completed the support frame is raised to remove the mask from the surface of the fixed member. The sensors are biased and remain in engagement with the shadow mask whereby the sensor readings verify that objectionable deformation of the shadow mask did not occur during the welding operation.

2 Claims, 4 Drawing Figures

APPARATUS FOR VERIFYING THE ACCEPTABILITY OF THE CURVATURE OF A CURVED OBJECT

BACKGROUND

This invention relates generally to the production of curved objects and particularly to apparatus for verifying the acceptability of the curvature of curved objects, such as kinescope shadow masks after such masks are welded to support frames.

A color picture tube includes a color selection electrode, commonly called a shadow mask, which causes the electron beams to impact phosphors of the proper light emitting color. The viewing screen of a color picture tube is curved along at least one axis. Accordingly the shadow mask must have essentially the same curvature as the phosphor screen. Shadow masks are fabricated from thin conductive metal and include a large plurality of apertures. For these reasons shadow masks are flimsy and easily deformed. A shadow mask therefore is welded to a sturdy frame which lends physical support to the mask. A plurality of apertured leaf springs are welded to the sides of the shadow mask frame. The apertures in the springs engage studs which are embedded in the sidewalls of the glass faceplate panel to support the shadow mask at a particular distance from the screen. The space between the screen and the shadow mask is called the Q space and is a very critical dimension because variations in the Q spacing can cause the electron beams to impact phosphors of the wrong light emitting color causing discoloration of the visual display.

The Q spacing is critical and therefore any one of several things can occur to cause electron misregistration and discoloration resulting therefrom. For example, concave or convex dents in the shadow mask can cause the electron beams to impact the wrong color of phosphor. Also, the shadow mask and shadow mask frame can be improperly aligned prior to welding the mask to the frame causing the mask to be tilted with respect to the screen. Additionally the welding process adds heat to both the frame and shadow mask and therefore warpage can cause misregistration of the electron beams.

For these reasons there is a need for an apparatus for verifying the acceptability of the curvature of a curved object immediately following the processing step. The present invention fulfills this long felt need.

SUMMARY

Apparatus for verifying the acceptability of the curvature of a curved article after a processing step includes a fixed member having a curved surface configured to conform to the curvature of the article. A plurality of article sensors is spaced along the curved surface to engage an article placed on the surface. A bilaterally movable support frame is arranged about the fixed member, whereby an article is displaced from, or engaged with, the surface in response to movement of the frame. Article supports are affixed to the support frame at positions about the fixed member whereby an article on the supports engages the curved surface and whereby the article is removed from engagement with the surface by movement of the frame. The sensors remain in contact with the article after movement of the support frame whereby the sensors detect any deformation in the curvature of the article after the processing step.

Detailed Description

Figure 1:
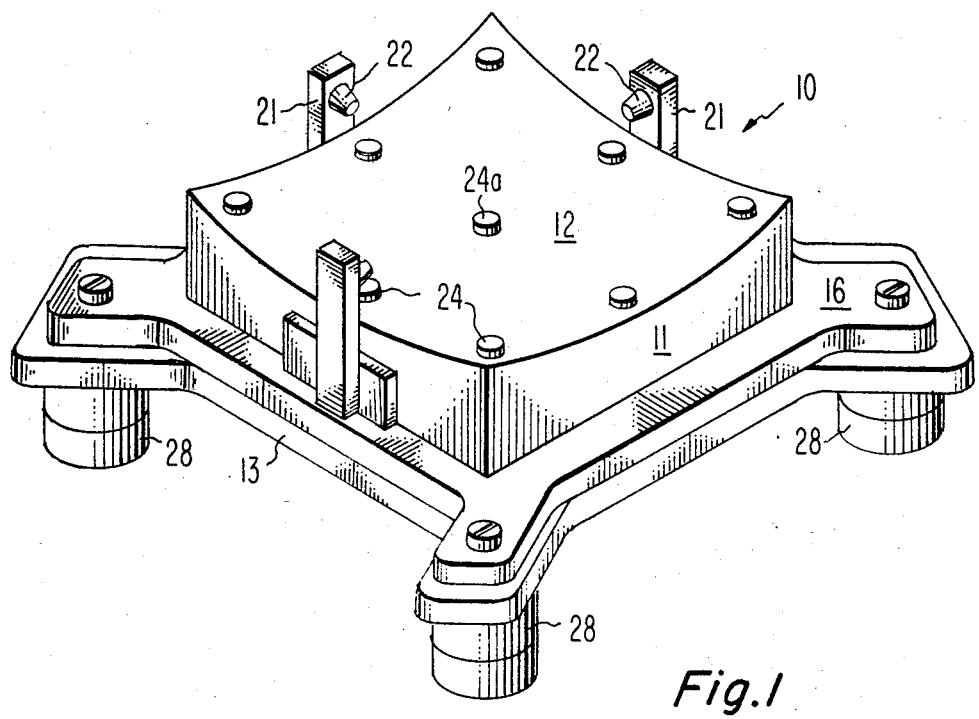
FIG. 1 is an isometric view of a preferred embodiment.
Figure 3:
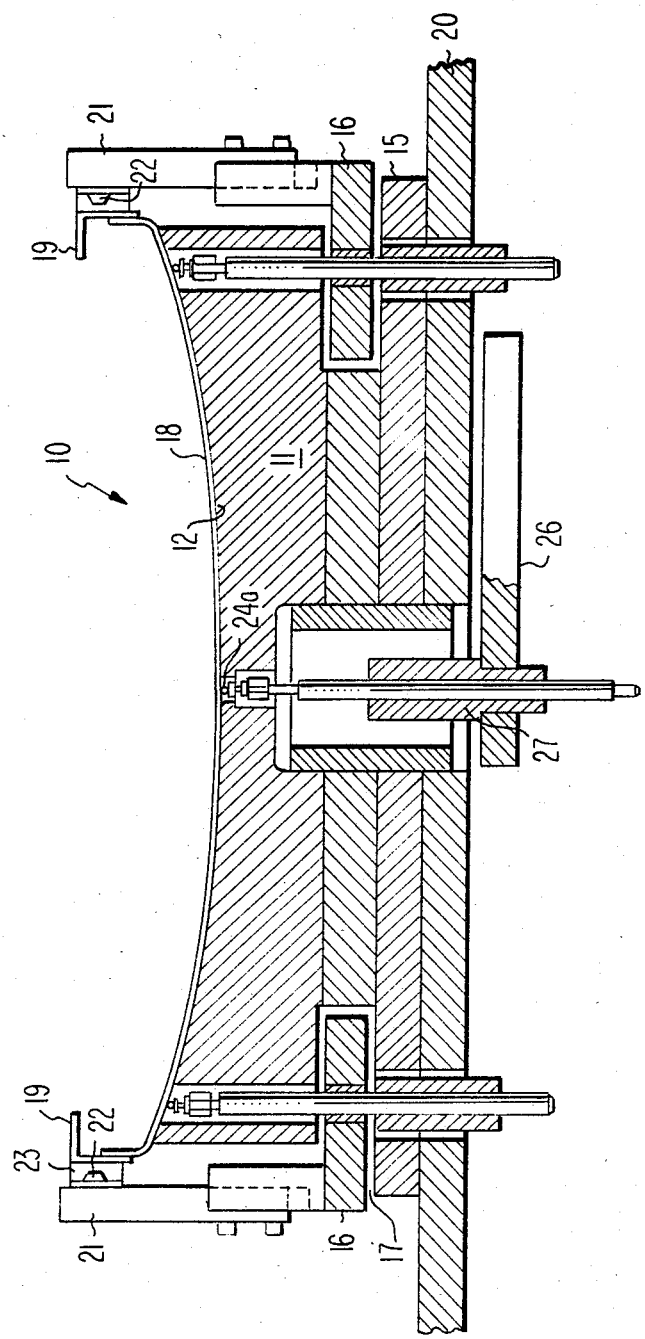
FIG. 3 is a cross section taken along line 3—3 of FIG. 2.

In FIG. 1, an apparatus 10 for verifying the acceptability of curved surfaces includes a fixed member 11 having a curved surface 12. The radii and curvature of the surface 12 are the same as those of the object the curvature of which is to be verified. In FIG. 3 the fixed member 11 is affixed to fixed plates 13 and 15. The plate 15 can be supported by a table or frame 20 which supports the apparatus 10 the desired height above the floor. The fixed member 13 is smaller than the fixed member 11 to form a peripheral recess 14 around the entire perimeter of the fixed member 11. A movable support frame 16 is arranged about the fixed member and partially extends into the peripheral recess 14. A space 17 exists between the bottom surface of the fixed member 11 and the top surface of the movable support frame 16 when the support frame is in the lowered position during the processing operation, such as the welding of a shadow mask 18 to a frame 19. Article support members 21 are affixed to the support frame 16 at selected positions about the fixed member 11. The supports 21 include studs 22 which engage springs 23 that were previously welded to the shadow mask frame 19. In FIG. 1, the supports 21 and studs 22 are aligned with the vertical and horizontal axis of the fixed member 11, for a shadow mask these axes coincide with the major and minor axis of the picture tube. The studs 22, thus, are arranged at the same locations that the support studs of a picture tube are embedded in the faceplate panel sidewalls.

In a color picture tube the shadow mask is supported in the faceplate panel by studs similar to the studs 22. The Q spacing between the shadow mask and the screen, therefore, is determined by the distance of the shadow mask from the studs. Accordingly, in FIG. 3 the studs 22 are arranged above the curved surface 12 of the fixed member 11 at a height dictated by the desired Q spacing of the picture tube in which the assembly is to be installed. This height varies for different size tubes and accordingly the dimensions of the apparatus 10 are different for each shadow mask type. However, for support members 22 can be made adjustable to accommodate different different Q spacings for different tube types. The shadow mask 18 is firmly pressed against the curved surface 12 by a platen (not shown) having a convex curved surface which conforms to the curvatures of the shadow mask 18 and the curved surface 12. Additionally, the frame 12 is accurately held in place by the studs 22 and springs 23 as the shadow mask 18 is welded onto the frame 19 and therefore with the Q spacing is accurately established.

In FIGS. 1 and 3, a plurality of article sensors 24 are arranged about the curved surface 12 of the fixed member 11. The sensors 24 can be either air or spring biased upwardly so that the sensing element normally extends beyond the curved surface 12. Accordingly, a shadow mask 18 on the fixed member 11 presses the sensors 24 downwardly and the ends of the sensors are in contact with the shadow mask. In this position the sensors 24 are in the reference, or zero, position.

Figure 4:
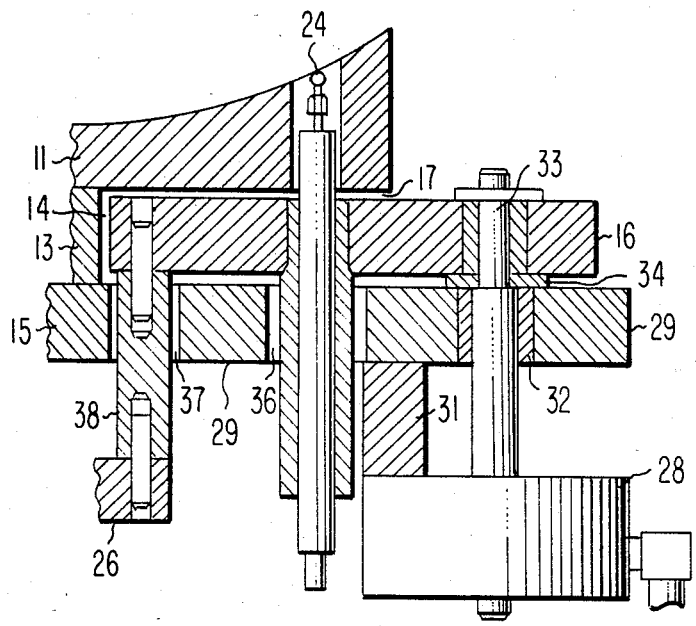
FIG. 4 is a cross section of the lifting mechanism taken along line 4—4 of FIG. 2.
Figure 2:
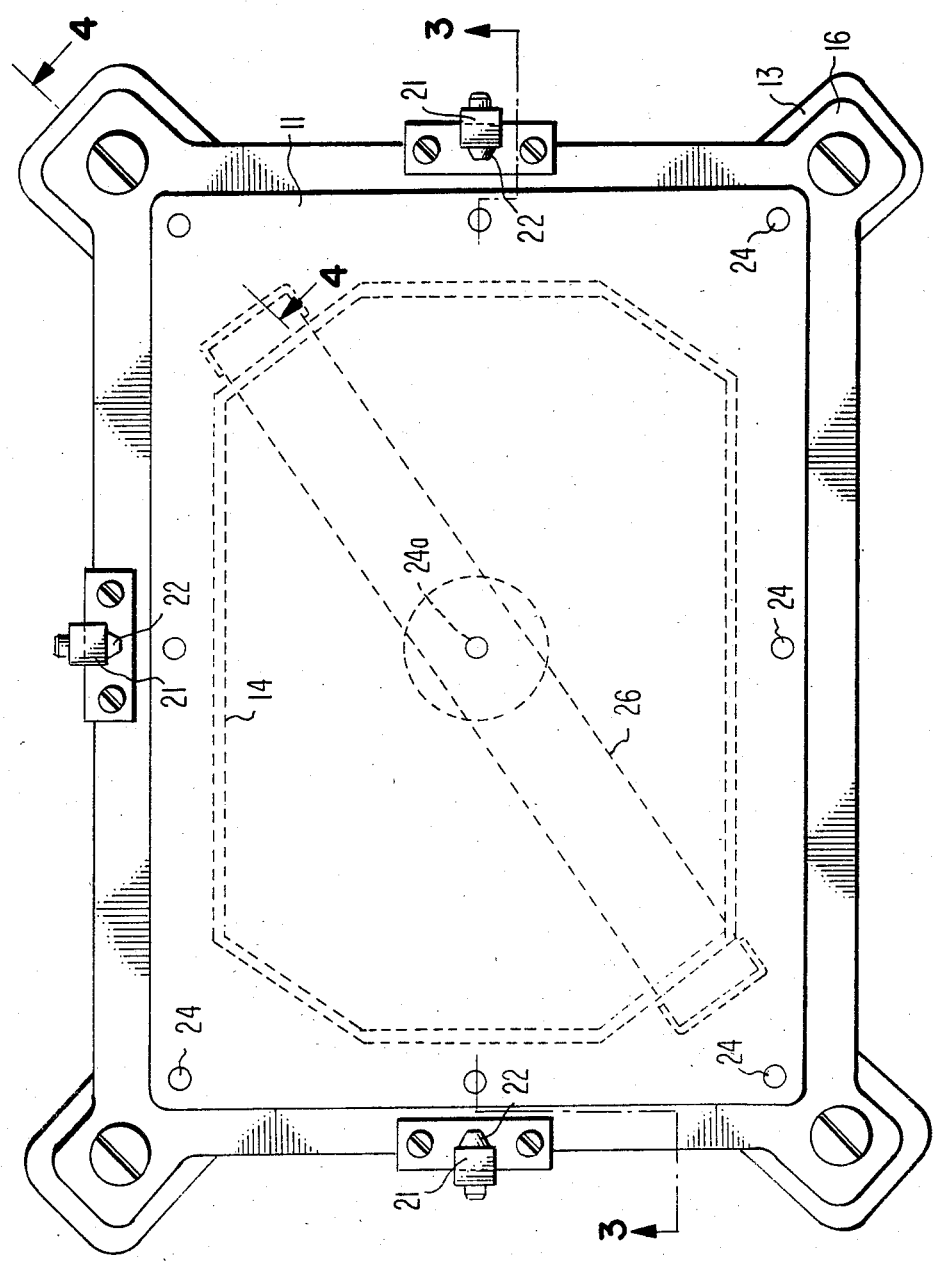
FIG. 2 is a top view looking straight down on FIG. 1.

In FIGS. 2, 3 and 4 a support bar 26 is affixed to the movable support frame and extends along a diagonal of the apparatus 10. The support bar 26 supports a sensor 24a in the center of the apparatus. A housing 27 is affixed to the support bar 26 to give the center sensor 24a vertical stability.

In FIG. 4 a cylinder 28, which can be a hydraulic or air cylinder, is fixed to a stationary member 29 by a standoff 31. A shaft 33 of the cylinder 28 is slideable within a bushing 32 and is attached to the movable support frame 16. A stop 34 is free to move with shaft 33. The thickness of the stop 34 establishes the lowest position which can be assumed by the movable support frame 16. The sensor 24 passes through a hole 36 in the stationary member 29 and is fixed to the movable support frame 16 and accordingly is movable with the frame. The support bar 26 is affixed to a brace 38 which passes through another aperture 37 in the stationary member 29. The brace 38 is affixed to the movable support frame 16 whereby the centered sensor 24a is also movable with the movable support frame 16. As shown in FIG. 1, one of the cylinders 28 is arranged at each corner of the apparatus 10.

In operation, initially the cylinders 28 are deactuated in the lowered position and the movable support frame 16, and the stop 34 rest on the upper surface of the stationary member 29. A shadow mask is placed on the concave curved surface 12 of the fixed member 11 biasing the sensors 24 downwardly into the reference position. A shadow mask frame 19 is supported on the support members 21 and the shadow mask 18 and the frame 19 are properly positioned for welding them together. A platen (not shown) having a convex surface compatible with the curve of the shadow mask 18 and the curved surface 12 of the fixed member 11 is brought into engagement with the shadow mask 18 to press the shadow mask 18 into firm engagement with the curved surface 12. The shadow mask 18 is thus pressed firmly against the curved surface 12 and the sensors 24 engage the mask whereby any concave or convex dents in the shadow mask are at least temporarily removed and all sensors read zero. Additionally, the shadow mask frame 19 is accurately arranged in the desired position by the studs 22. Accordingly the relative orientations of the shadow mask 18 and the shadow mask frame 19 are accurately positioned for welding. The shadow mask is then welded to frame 19 using any of several known welders available. After the welding is completed the convex platen is moved out of engagement with the shadow mask 18. The cylinders 28 are simultaneously actuated to raise the movable support frame 16 upwardly by a distance determined by the spacing 17 between the fixed member 11 and the movable support 16 or until the cylinders 28 are fully extended. The gages 24 move along with the movable support frame 16 and accordingly remain in engagement with the shadow mask 18. However, the shadow mask is no longer pressed against the curved surface 12 and any permanent concave or convex deformations in the shadow mask will naturally reappear. The sensors 24 are free to move because they are air or spring biased against the shadow mask and therefore will remain in contact with any deformations within the shadow mask 18. Accordingly, any deformation will result in the generation of an output signal which is different from the output signals of the other sensors. This output signal is read, either automatically or by the operator of the system, to indicate that the mask is unacceptable for the desired use. Additionally, after the support frame 16 is raised the shadow mask frame 19 is supported in the same manner that it will be supported in a tube, and therefore, any deformation of the frame or shadow mask caused by heating during the welding operation will be detected by the sensors 24 and the unit will be rejected. Also, it is possible for the frame 19 to be improperly placed on the studs 22. The mask 18 will then be crooked with respect to frame 19 and the Q spacing will not be uniform. The motion of the movable support frame 16 typically will cause the frame 19 to assume the proper position and the sensors 24 will detect the nonuniform Q space.

What is claimed is:

1. Apparatus for verifying the acceptability of the curvature of a curved article after a processing step comprising:

a fixed member having substantially straight sides and a curved surface configured to conform with the curvature of said article;

a plurality of article sensors spaced along and embedded in said surface whereby said sensors engage an article placed on said surface, said sensors being biased to normally extend beyond said curved surface whereby said article depresses said sensors into said curved surface and said sensors remain in engagement with said surface when said article is moved away from said curved surface;

a movable support frame arranged about said fixed member, said support frame being bilaterally movable in directions substantially parallel to said sides whereby an article is displaced from, or engaged with, said surface in response to movement of said frame;

article support means affixed to said support frame at positions about said fixed member, said support means being adapted to support an article whereby said article engages said surface during a processing step and whereby said article is removed from engagement with said surface by movement of said frame after said processing step, said sensors remaining in contact with said article after said movement whereby said sensors detect any deformation in the curvature of said article after said processing step;

a peripheral recess in the periphery of said fixed member, a portion of said frame extending into said recess, said frame being spaced a preselected distance from said recess whereby said movement is restricted by said recess; and means for moving said frame.

2. The apparatus of claim 1 wherein said movable frame is substantially rectangular, and wherein said means for moving includes at least one cylinder arranged in the proximity of the corners of said frame.

* * * * *